(12) United States Patent
Lane et al.

(10) Patent No.: US 10,753,374 B2
(45) Date of Patent: Aug. 25, 2020

(54) SLIP JOINT CLAMPS AND METHODS FOR USE IN A NUCLEAR REACTOR JET PUMP

(71) Applicant: GE-Hitachi Nuclear Energy Americas LLC, Wilmington, NC (US)

(72) Inventors: Hampton W. Lane, Wilmington, NC (US); Jack T. Matsumoto, San Jose, CA (US); Ahdee Q. Chan, Morgan Hill, CA (US); Emanuel Klein, Wilmington, NC (US); David J. Bell, San Jose, CA (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 980 days.

(21) Appl. No.: 15/149,352

(22) Filed: May 9, 2016

(65) Prior Publication Data

US 2017/0321726 A1 Nov. 9, 2017

(51) Int. Cl.
| | |
|---|---|
| *G21C 19/28* | (2006.01) |
| *F04F 5/46* | (2006.01) |
| *F04F 5/00* | (2006.01) |
| *F16B 2/14* | (2006.01) |
| *F16B 2/18* | (2006.01) |
| *G21C 15/25* | (2006.01) |

(52) U.S. Cl.
CPC ............... *F04F 5/463* (2013.01); *F04F 5/00* (2013.01); *F16B 2/14* (2013.01); *F16B 2/185* (2013.01); *G21C 15/25* (2013.01)

(58) Field of Classification Search
CPC ...... G25C 15/25; G25C 15/24; G25C 15/243; G25C 15/247; G21C 19/28
See application file for complete search history.

(56) References Cited

U.S. PATENT DOCUMENTS

| | | | |
|---|---|---|---|
| 5,978,433 A | * 11/1999 | Erbes | G21C 15/25 376/260 |
| 2002/0106281 A1 | 8/2002 | Erbes et al. | |
| 2003/0118144 A1 | 6/2003 | Erbes et al. | |
| 2008/0029969 A1 | 2/2008 | Torres | |
| 2008/0031741 A1 | 2/2008 | Torres | |
| 2010/0329412 A1 | 12/2010 | Ellison et al. | |
| 2011/0069804 A1 | 3/2011 | Lynch | |
| 2012/0012728 A1 | 1/2012 | Bass | |
| 2012/0032064 A1 | 2/2012 | Defilippis et al. | |
| 2012/0057992 A1 | 3/2012 | Sprague et al. | |

(Continued)

*Primary Examiner* — Marshall P O'Connor
(74) *Attorney, Agent, or Firm* — Ryan Alley IP

(57) ABSTRACT

Slip joint clamps seat on a diffuser end via external features of the diffuser, like guide ears, regardless of slip joint wear or damage. The clamps can be opened and closed to surround an inlet mixer forming a slip joint with the diffuser without disassembly. Slip joint clamps drive or bias the inlet mixer in a lateral direction largely perpendicular to the axial orientation and end of the diffuser to achieve a desired preload force in the inlet mixer and clamp connection. Clamp arms include rotatable halves that, when joined, form a complete fill between an inner surface of the diffuser and outer surface of the inlet mixer. A lateral drive pushes the inlet mixer against the clamp and may include a resistive element. An accessible set of guide ear bolts and lateral driving bolts permit exterior manipulation to axially mount or laterally bias the clamp in the slip joint.

15 Claims, 7 Drawing Sheets

(56) References Cited

U.S. PATENT DOCUMENTS

| | | |
|---|---|---|
| 2012/0170703 A1 | 7/2012 | Sprague |
| 2012/0170704 A1 | 7/2012 | Sprague et al. |
| 2012/0219103 A1 | 8/2012 | Lynch |
| 2012/0288053 A1* | 11/2012 | Sprague .................. F04F 5/54 376/392 |
| 2013/0308739 A1 | 11/2013 | Bass et al. |
| 2013/0315365 A1 | 11/2013 | Dulka et al. |
| 2014/0079468 A1* | 3/2014 | Jensen .................... F04F 5/46 403/188 |
| 2015/0159790 A1 | 6/2015 | Markham |
| 2015/0240838 A1 | 8/2015 | Watanabe et al. |

* cited by examiner though general broad rules of construction may be applied...

SLIP JOINT CLAMPS AND METHODS FOR USE IN A NUCLEAR REACTOR JET PUMP

BACKGROUND

FIG. 1 is a perspective view of a related art nuclear boiling water reactor (BWR) jet pump assembly 8. The major components of the jet pump assembly 8 include a riser pipe 3 and two inlet mixers 4 that insert into respective diffusers 2. Jet pump restrainer brackets are used to stabilize movement of the inlet mixers 4 and reduce movement of and leakage at slip joint 6 that exists at the interface between inlet mixers 4 and diffusers 2. One type of movement is Flow Induced Vibration, or FIV, that causes slip joint leakage due to high-velocity flows in and around assembly 8. Restrainer brackets minimize relative movement between inlet mixers 4 and restrainer brackets to minimize leakage or damage around slip joint 6.

FIG. 2 is a detailed view of related art slip joint 6 that exists between inlet mixer 4 and diffuser 2 of a BWR jet pump assembly. Bottom portion 4a of the inlet mixer 4 inserts into upper crown 2a of diffuser 2. A top edge of diffuser 2 includes one or more guide ears 2b to allow tolerances and easier connection between inlet mixer 4 and diffuser 2. The interface or mating between inlet mixer 4 and diffuser 2 is referred to as slip joint 6.

FIG. 3 is a cross-sectional view of related art slip joint 6 between inlet mixer 4 and diffuser 2 of a BWR jet pump assembly, showing internal relationships between components. Lowest distal end 4b of inlet mixer 4 rests in upper crown 2a of diffuser 2, to form slip joint 6. Inlet mixer FIV may occur in the slip joint 6 when tolerances between distal end 4b of inlet mixer 4 and upper crown 2a of diffuser 2 do not exactly match due to wear or improper machining. Leakage may occur at this interface due to both a poor fit and FIV, as fluid coolant leaks between lowest distal end 4b of inlet mixer 4 and upper crown 2a of diffuser 2 and out of the slip joint 6.

SUMMARY

Example embodiments include slip joint clamps that can vertically join to a diffuser end and laterally push or drive an inlet mixer to stabilize and prevent vibration and leakage in a slip joint between the diffuser and inlet mixer. Example clamps may include clamp arms that are moveable with respect to each other to allow expansion and closing around a slip joint to seat on the diffuser, such as ring halves joined about a clevis pin for example. Example clamps further include structures that push against the inlet mixer, like a lateral drive that transversely pushes the inlet mixer against the clamp. For example, the lateral drive may include a leaf spring that can be biased through a driving bolt and transmission to allow biasing and preloading internal to the clamp from the accessible driving bolt at an exterior surface of the clamp. Example clamps include an axial mount that attach and secure the clamp to a diffuser exterior, such as guide ear clamps that extend around a guide ear common on a diffuser terminus, for example. This axial mounting may permit example clamps to seat on a diffuser end and fill the slip joint around the diffuser end without requiring disassembly or loading on the inlet mixer. The lateral loading may thus independently compress the inlet mixer against an interior of the clamp to prevent vibration in and leakage through the slip joint.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

DETAILED DESCRIPTION

Figure 1:
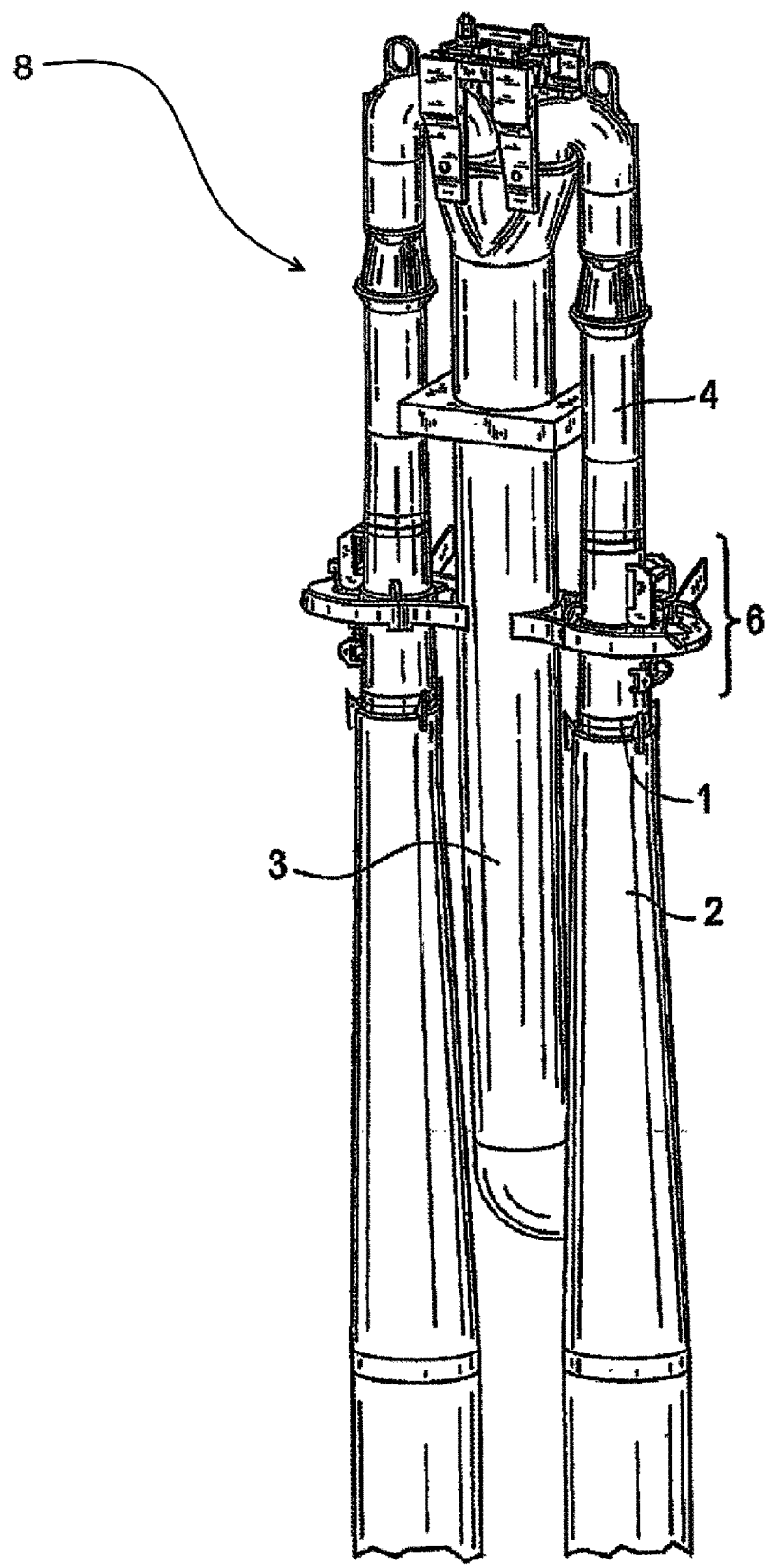
FIG. 1 is an illustration of a related art jet pump assembly for use in a nuclear power plant.

Because this is a patent document, general broad rules of construction should be applied when reading and understanding it. Everything described and shown in this document is an example of subject matter falling within the scope of the appended claims. Any specific structural and functional details disclosed herein are merely for purposes of describing how to make and use example embodiments or methods. Several different embodiments not specifically disclosed herein fall within the claim scope; as such, the claims may be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.). Similarly, a term such as "communicatively connected" includes all variations of information exchange routes between two devices, including intermediary devices, networks, etc., connected wirelessly or not.

As used herein, the singular forms "a", "an" and "the" are intended to include both the singular and plural forms, unless the language explicitly indicates otherwise with words like "only," "single," and/or "one." It will be further understood that the terms "comprises", "comprising,", "includes" and/or "including", when used herein, specify the presence of stated features, steps, operations, elements, ideas, and/or components, but do not themselves preclude the presence or addition of one or more other features, steps, operations, elements, components, ideas, and/or groups thereof.

It should also be noted that the structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from the single operations described below. It should be presumed that any embodiment having features and functionality described below, in any workable combination, falls within the scope of example embodiments.

The Inventors have newly recognized that slip joints in nuclear reactor jet pumps often have worn interfaces between diffusers and inlet mixers at the slip joint. The wear may be ¼-inch of depleted metal or other material due to FIV around a perimeter of the slip joint, which can both worsen leakage through the slip joint and render existing slip joint clamps and FIV solutions inoperable without adequate material to seal. Conventional repairs for worn slip joint interfaces may involve disassembly of the inlet mixer, requiring substantial downtime and repair resources. The Inventors have newly recognized a need for slip joint repair without significant disassembly or dependence on pristine slip joint structures that still reduces leakage and FIV in the slip joint. Example embodiments described below uniquely enable solutions to these and other problems discovered by the Inventors.

The present invention is clamps that are useable with slip joints in nuclear reactor jet pumps to preload the same. In contrast to the present invention, the few example embodiments and example methods discussed below illustrate just a subset of the variety of different configurations that can be used as and/or in connection with the present invention.

Figure 4:
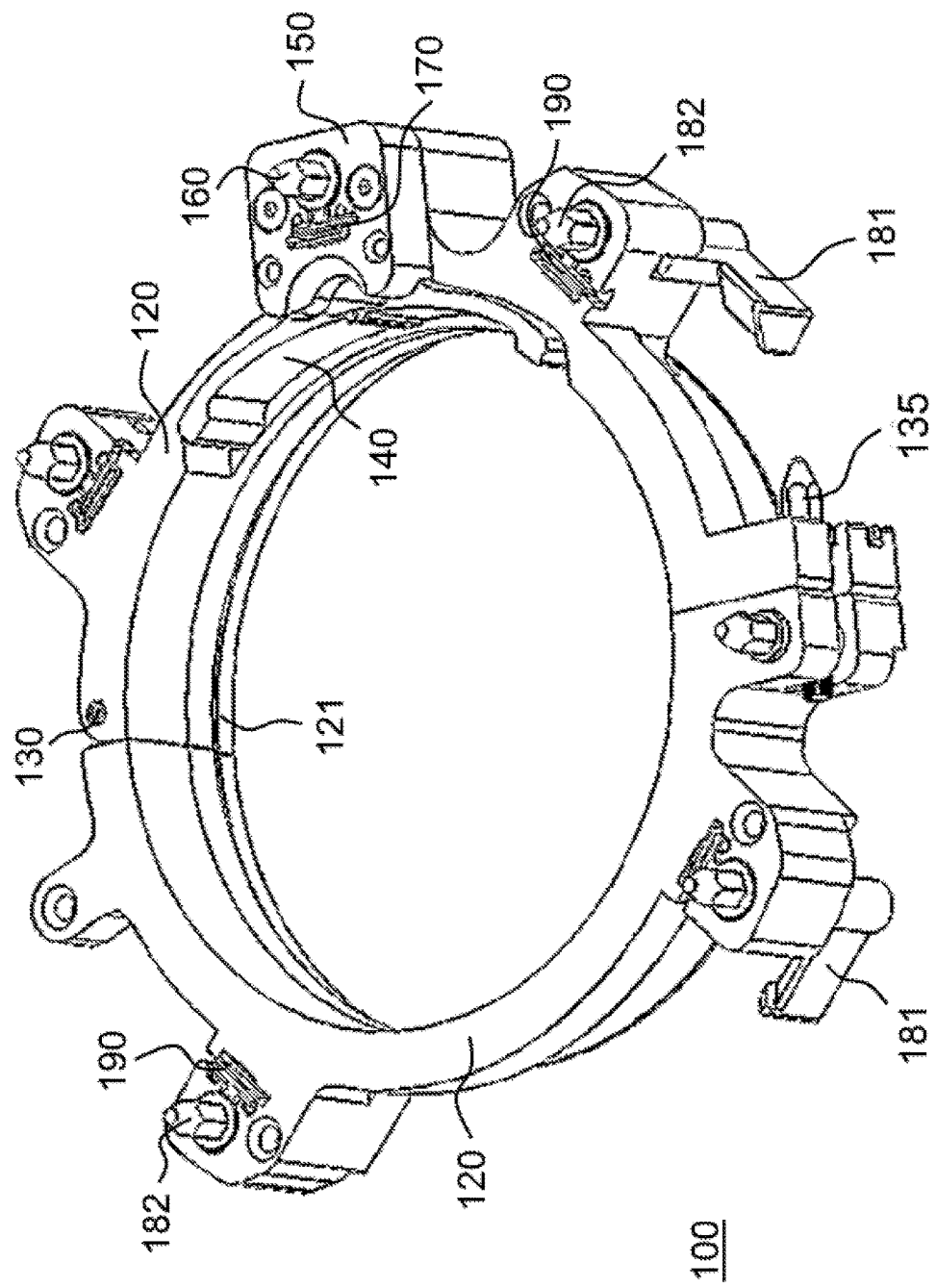
FIG. 4 is an illustration of an example embodiment slip joint clamp.

FIG. 4 is an illustration of an example embodiment slip joint clamp 100. As seen in FIG. 4, slip joint clamp 100 is shaped to match an inlet mixer and diffuser interface at a slip joint, such as an annular shape. Slip joint clamp 100 is shaped to seat axially onto a diffuser (such as diffuser 2 in FIG. 2) while surrounding an exterior of an inlet mixer (such as inlet mixer 4 in FIG. 2) at a slip joint. Slip joint clamp 100 may completely or partially surround and/or fill a slip joint by seating on a diffuser and surrounding an inlet mixer of the slip joint.

Example embodiment slip joint clamp 100 may include two ring halves 120 that are joined to form an annular shape or other shape to match a slip joint shape. Ring halves 120 may be moveable with respect to one another if joined by a hinge or socket or any other relative joining mechanism, including a clevis pin 130, for example. Clevis pin 130 may permit ring halves 120 to expand/be separated in a transverse or radial direction without fully disconnecting or moving relatively in an axial position, allowing clamp 100 to adjust to and move over diffuser and/or inlet mixer structures. In this way, example embodiment slip joint clamp 100 can be installed about a slip joint without disassembly of any inlet mixer or diffuser, because clamp 100 can open halves 120 to fit around such structures and close halves 120 when in place on a diffuser, for example.

Example embodiment slip joint clamp 100 may include a fastening element to ensure it may be expanded in a transverse direction so as to be removably installed about a slip joint. For example, a collar bolt 135 may be used to engage and draw together ring halves 120, such as by screwing into one half 120 while being mounted in another half 120, to form a substantially annular shape of clamp 100 with no relative movement of ring halves 120 when collar bolt 135 is engaged between the two. Collar bolt 135 may not apply additional tension or shaping beyond a point when ring halves 120 are fully mated; that is, collar bolt 135 may rigidly yet removably join ring halves 120 into a configuration that mounts on a diffuser without potential for additional clamping from collar bolt 135 when so joined. In this way, example embodiment clamp 100 may remain reliably closed without significantly transversely loading a diffuser on which it seats.

Slip joint clamp 100 includes an inner surface 121 that is shaped to seat against an inlet mixer and extend down along an inner surface of a diffuser at a slip joint. Inner surface 121 may be formed by ring halves 120, for example, being brought together about clevis pin 130 and closed into a ring shape. Inner surface 121 may be substantially annular at higher axial positions to match an outer surface of a cylindrical inlet mixer. Inner surface 121 may further include a flange or thinner ring element at a lower axial position that matches an interface between an outer surface of a cylindrical diffuser and an inner surface of a cylindrical diffuser at the slip joint. In this way, example embodiment slip joint clamp 100 may be shaped and sized like a sleeve that internally fits against a diffuser while externally seating on a top of the diffuser and fitting externally against an inlet mixer.

Slip joint clamp 100 may include axial joints or anchors that retain clamp 100 on an upper end, such as a crown, of a diffuser at a slip joint. For example, ear clamp 181 may be shaped and sized to clamp around a guide ear of a diffuser (such as ear 2b in FIG. 2) in order to axially hold clamp 100 at a top end of a diffuser. A draw bolt 182 may be paired with ear clamp 181 to allow axial movement of ear clamp 181 and thus clamping against a lower side of the ear. Further, a ratchet surface 190 or other locking mechanism can permit one-way movement or tensioned securing of draw bolt 182 when paired with a matching ratchet surface of draw bolt 182 in example embodiment clamp 100. When draw bolt 182 is turned, ear clamp 181 may be drawn upward against an ear or other surface, axially clamping clamp 100, and ratchet surface 190 may prevent reversing of draw bolt 182 and thus loosening.

Multiple sets of ear clamp 181, draw bolt 182, and ratchet 190 may be positioned about clamp 100. In this way, clamp 100 may be axially secured to and tightened against each guide ear at multiple radial positions, ensuring clamp 100 remains stationary and secure while exerting axial clamping forces only against a top end of a diffuser. When halves 120 and inner surface 121 are shaped to substantially fill a slip joint between a diffuser and inlet mixer, axial securing of clamp 100 may prevent fluid from escaping the slip joint. Because guide ears are less likely to become worn through FIV and other jet pump operations, they may be used for axially clamping and anchoring clamp 100 without regard for wear or other damage that may have occurred inside a diffuser or inlet mixer at the slip joint.

Example embodiment slip joint clamp includes a lateral-loading drive that can independently push or bias an inlet mixer at a slip joint to a desired preloading condition. Such lateral loading may secure the inlet mixer against inner surface 121 and further prevent FIV and leakage. The lateral-loading drive provides at least up to 750 pounds-force of lateral preload against an inlet mixer. For example, a leaf spring 140 may be laterally driven by a lateral driving bolt 160 mounted in a top plate 150. A ratchet surface 170 may allow tightening or one-way movement of driving bolt 160 until 750 or more pounds of force are exerted by leaf spring 140. Additional operational examples of driving bolt 160 and leaf spring 140 are described below in connection with FIG. 6.

Figure 2:
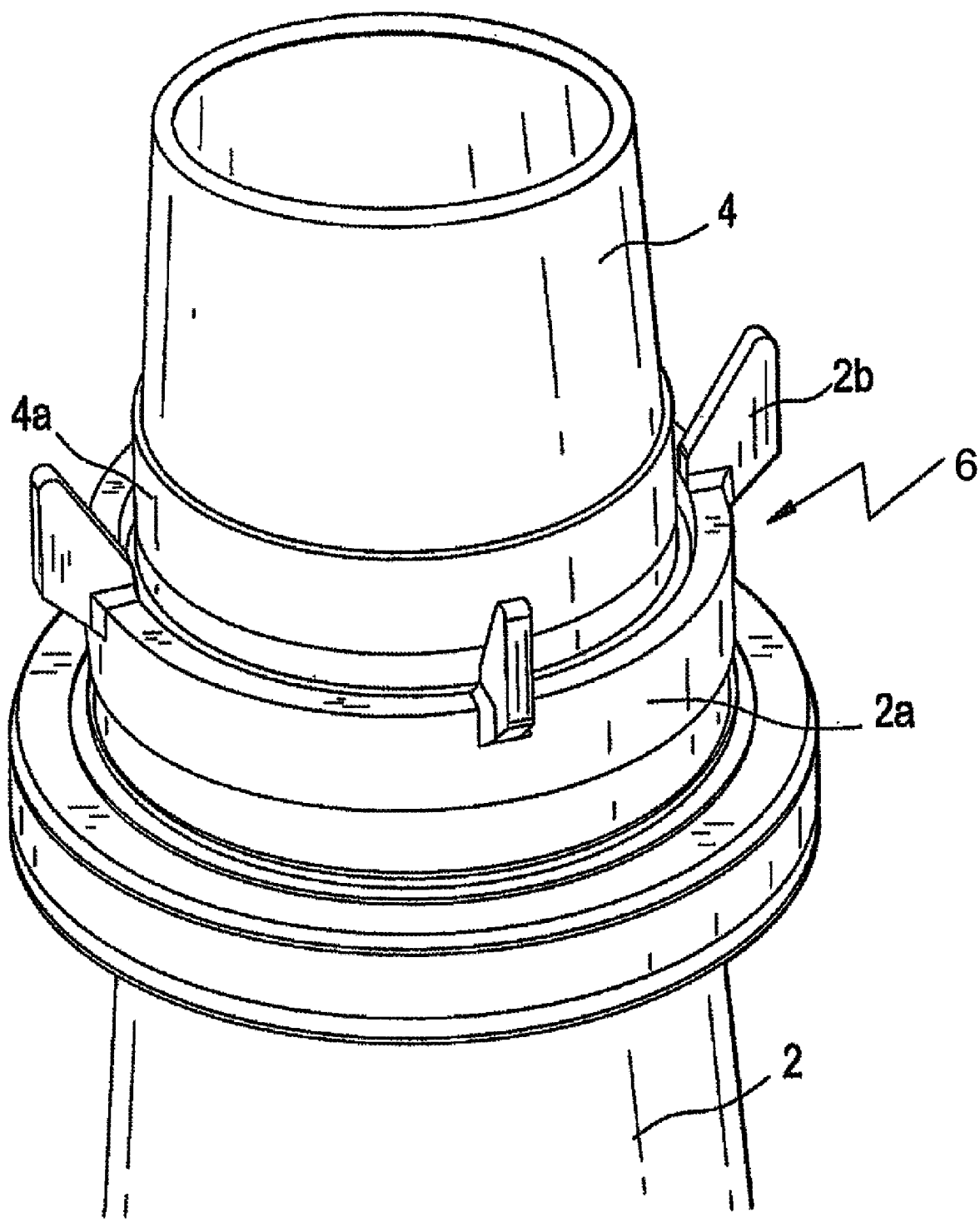
FIG. 2 is an illustration of a slip joint in the related art jet pump assembly of FIG. 1.
Figure 3:
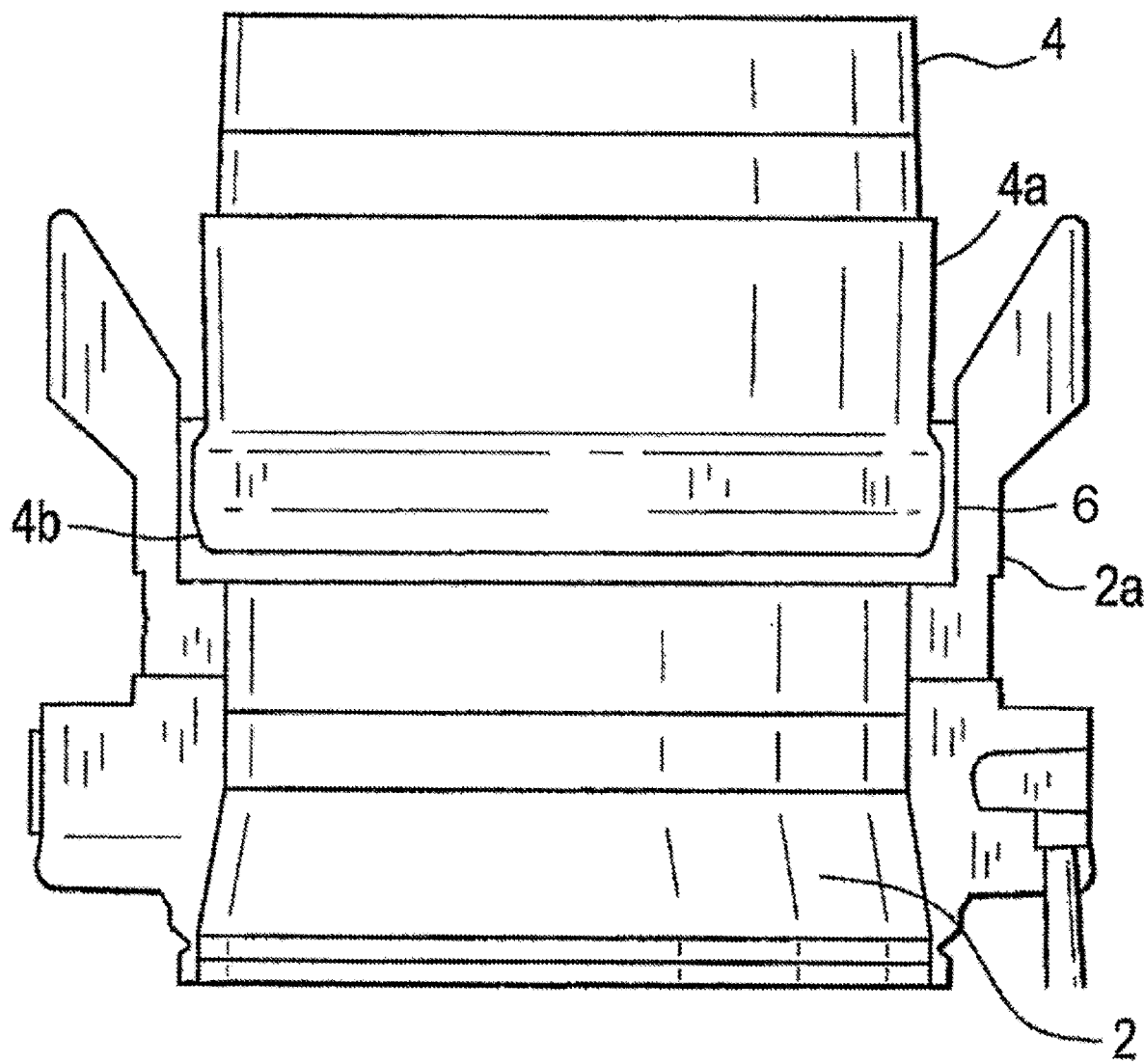
FIG. 3 is a cross-section of the slip joint of FIG. 2.
Figure 5:
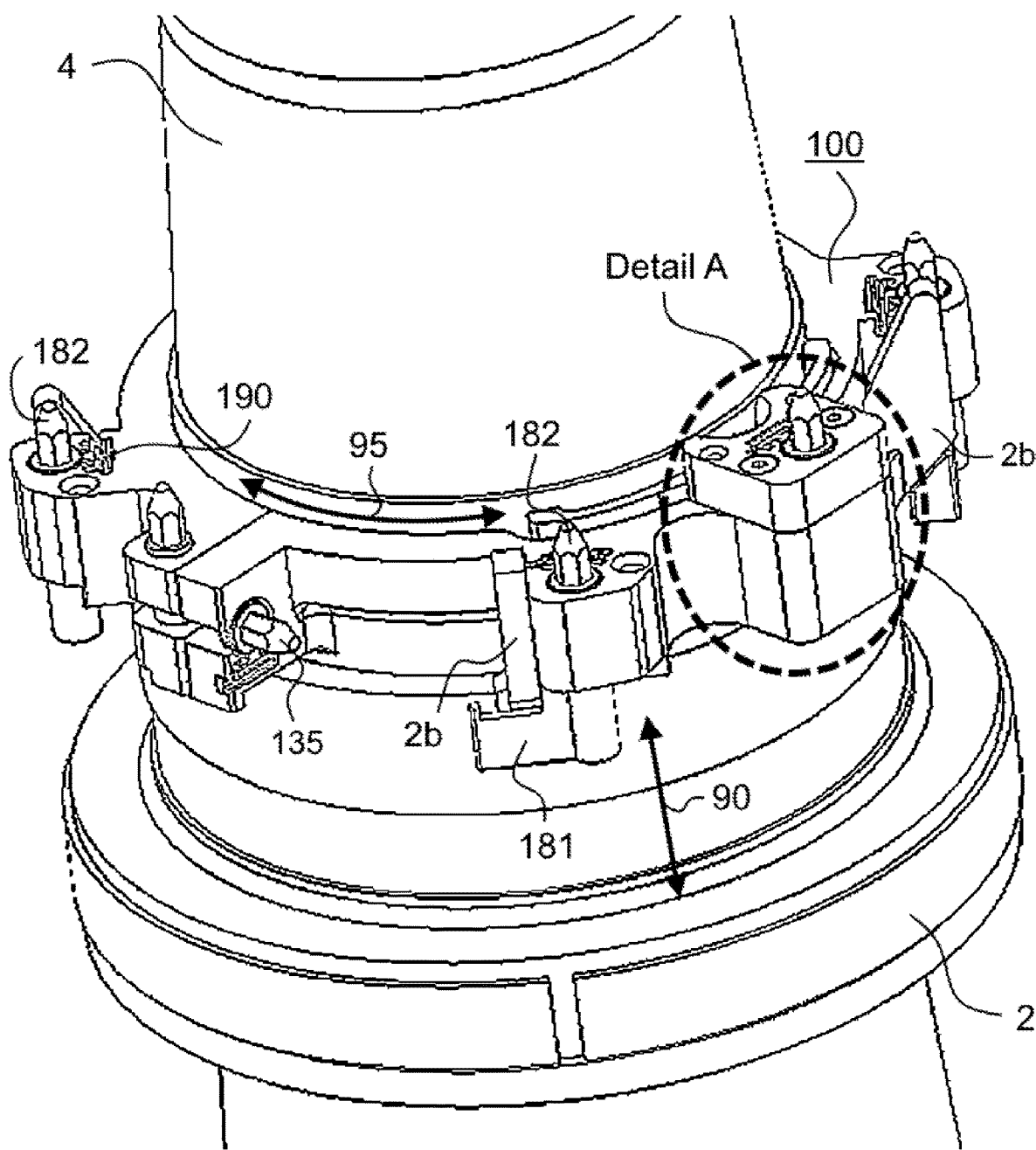
FIG. 5 is an illustration of an example embodiment slip joint clamp installed about a slip joint in a jet pump assembly.

FIG. 5 is an illustration of example embodiment slip joint clamp 100 as installed at a slip joint between inlet mixer 4 and diffuser 2, such as related art structures of FIGS. 1-3 in existing or future nuclear reactor jet pumps. Inlet mixer 4 and/or diffuser 2 may have been damaged or subject to extensive FIV during operation or otherwise, causing wear and damage to their surfaces where they mate at the slip joint. As such, there may be significant fluid leakage and relative movement between inlet mixer 4 and diffuser 2 without slip joint clamp 100 being installed. Or, inlet mixer 4 may require axial adjustment with respect to diffuser 2 without disassembly or removal of the entire slip joint when installing an example embodiment clamp.

As shown in FIG. 5, example embodiment clamp 100 can axially seat at a top terminus, or crown, of diffuser 2 about a slip joint with inlet mixer 4. This positioning may be achieved without movement of diffuser 2 or inlet mixer 4, because of how clamp 100 can be opened and closed or otherwise fit around these structures. For example, clamp 100 may be opened in lateral or radial direction 95 to fit around inlet mixer 4 without disassembly of the same, and then clamp 100 may be closed to fit about a top end of diffuser 2 by radially closing halves or other portions of clamp 100, potentially about a clevis pin or other fastener. Collar bolt 135 may secure clamp 100 in a closed, continuous shape in radial direction 95 on diffuser 2.

Example embodiment clamp 100 may further be axially secured to diffuser 2 in order to prevent relative movement between clamp 100 and diffuser 2. For example, clamp 100 may be rotated in radial direction 95 until each ear clamp 181 is positioned axially under a corresponding guide ear 2b of diffuser 2. Draw bolt 182 may be tightened to move ear clamp 181 upward in axial direction 181, such as through threads or another connection. Because both ear clamp 181 and draw bolt 182 may be seated in clamp 100, this axial movement may cause a net axial downward force on clamp 100, securing clamp 100 to diffuser 2 in an axial direction. Ratchet surface 190 may prevent loosening of draw bolt 182 in order to maintain the secured positioning.

Example embodiment clamp 100 can be axially secured to diffuser 2 despite potential wear or damage to terminal or inner surfaces of diffuser 2. Moreover, example embodiment clamp 100 can be axially secured as seen in FIG. 5 without removing or requiring movement of inlet mixer 4 in axial direction 90, because clamp 100 can be axially secured through guide ears 2b. Thus, inlet mixer 4 can still be axially adjusted and repositioned with respect to a slip joint during installation of example embodiment clamp 100. Securing clamp 100 via guide ears 2b may also prevent relative movement of example embodiment clamp 100 in a radial direction 95.

Figure 6:
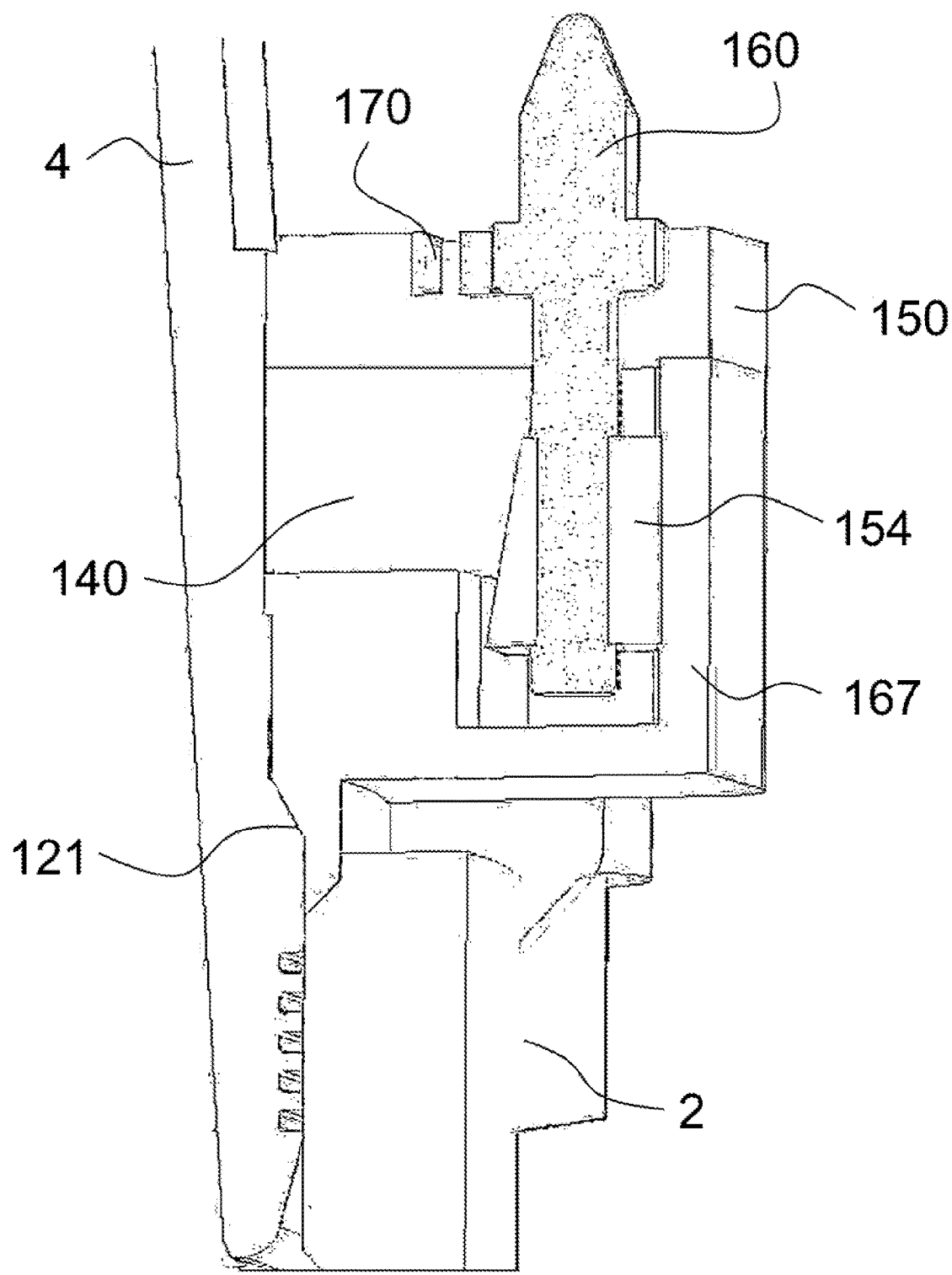
FIG. 6 is a cross-section of a detail of the slip joint clamp of FIG. 5.

FIG. 6 is a cross-section of the Detail A region of FIG. 5. As seen in FIG. 6, inner surface 121 of clamp 100 may seat down into diffuser 2, such that clamp 100 is flush against an inner perimeter of the same. For example, inner surface 121 may have a lower flange or other fitted section that narrows to fit within slip joint components. A bottom outer portion of inlet mixer 4 also seats against inner surface 121 of clamp 100. In this way, a narrowing portion of example embodiment clamp 100 and/or an otherwise specially shaped inner surface 121 may fit down into and seal a slip joint between diffuser 2 and inlet mixer 4, regardless of wear, damage, or non-fit among ends of those pieces and without requiring disassembly of those pieces for installation.

As further seen in FIG. 6 a lateral loading structure is useable in example embodiment clamp 100. Lateral driving bolt 160 may be extended through top plate 150 and extend down into a chamber 167 inside of example embodiment clamp 100 (FIG. 4). Wedge 154 may be secured to or a part of driving bolt 160 and captured by chamber 167, except where a wedged or angled surface seats against a surface of leaf spring 140 in inner surface 121 of clamp 100 (FIG. 4). Leaf spring 140 may additionally be axially restrained adjacent to chamber 167 by top plate 150. Because top plate 150 and chamber 167 may be bolted to, in integral within, example embodiment clamp 100, driving bolt 160 may be axially driven upward or downward relative to clamp 100 when seated in threads in top plate 150. Such axial movement in wedge 154 translates to transverse or radial compression of leaf spring 140 due to the angled surfaces and otherwise captured nature of leaf spring 140 and wedge 154 in chamber 167. A desired axial displacement or resultant force may be sustained through ratchet surface 170 or another lock that prevents drive bolt 160 from further moving after being set at a desired axial position. Thus, when clamp 100 is axially secured, such as to diffuser 2, a transverse load may be applied internal to clamp 100 without axial and/or diffuser involvement.

Figure 7:
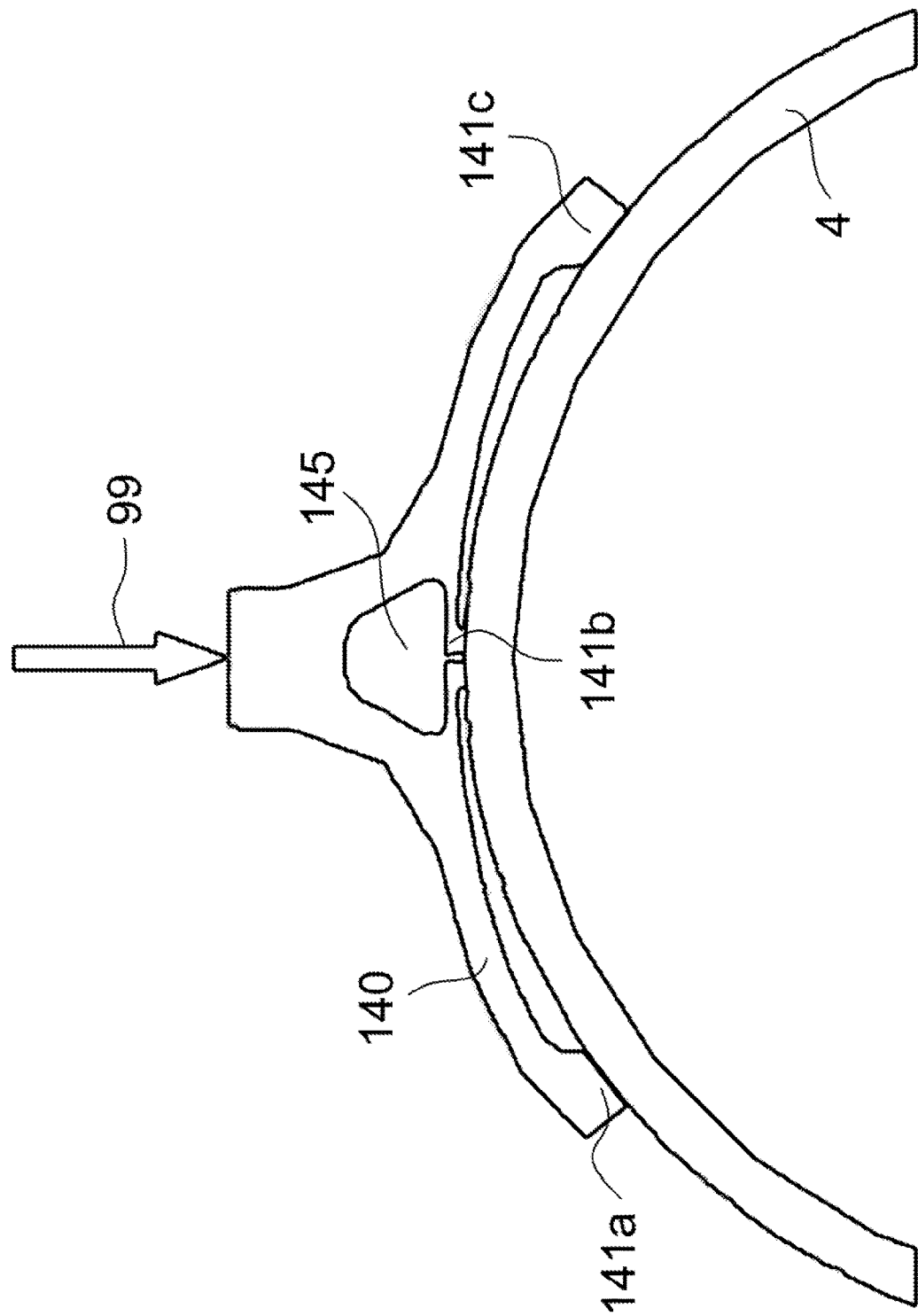
FIG. 7 is a selected axial view of an example leaf spring useable in connection with an example embodiment slip joint clamp.

FIG. 7 is an illustration of an example leaf spring 140 illustrating its shape and compression. Leaf spring 140 may extend some distance along a perimeter of inner surface 121 (as seed in FIG. 4) and be shaped such that under compression leaf spring 140 compresses against, and distributes force along, some length of an outer surface of inlet mixer 4. For example, leaf spring may extend along an eighth or more of a perimeter of inlet mixer 4. Leaf spring 140 may define a central void 145 where a post from top plate 150 (FIG. 6) may extend through to retain leaf spring 140 in chamber 167 in contact with wedge 154 (FIG. 6).

As seen in FIG. 7, force may be applied in transverse direction 99 when leaf spring 140 is installed in an example embodiment clamp at a slip joint and in contact with inlet mixer 4. Such force may come from, for example, wedge 154 being drawn up in cavity 167 by driving bolt 160 in FIG. 6. As the force in direction 99 approaches a desired preload force, such as 750-lbs, outer contact pads 141a and 141c of leaf spring 140 may extend angularly (direction 99 of FIG. 5) along inlet mixer 4, distributing such force. Finally, central contact pad 141b may come into contact with inlet mixer at the desired preload force, essentially distributing a large static force in a radial direction against inlet mixer 4. This force may compress inlet mixer 4 against an opposite inner surface 121 in clamp 100 (FIG. 4). Under a sufficiently large preload force, such as 750 pounds-force or more, inlet mixer 4 may be prevented from moving relative to a diffuser or undergoing FIV via this contact with clamp 100.

As seen, example embodiment slip joint clamp 100 can be axially secured to a diffuser and independently bias an inlet mixer. Installation on the diffuser may require attachment only to guide ears or other external structures without movement or involvement with an inlet mixer. Subsequent to installation on an end of the diffuser about a slip joint, example embodiment clamp 100 may be laterally biased via a lateral drive. This lateral biasing may exclusively preload the inlet mixer with up to or exceeding 750 pounds force in a lateral or radial direction to seat the inlet mixer against the clamp perimeter without involvement of the diffuser. This independent axial attachment to the diffuser and lateral preload of the inlet mixer may permit installation of example embodiment clamps on a variety of slip joint types and in varying conditions, reduce leakage through such slip joints, and prevent FIV in and damage between slip joint components.

Example embodiment clamp 100 may be fabricated of any materials that are compatible with an operating nuclear reactor environment, including materials that maintain their physical characteristics when exposed to high-temperature fluids and radiation. For example, metals such as stainless steels and iron alloys, nickel alloys, zirconium alloys, etc. are useable in example embodiment clamp 100. For example, leaf spring 140 may be X750 inconel of approximately 1-inch radial depth/thickness to provide a spring constant the yields up to 750 lbf preload force when compressed across its thickness. Bolts, clamp body, and connectors may be fabricated of stainless steels and other compatible materials to prevent fouling or metal-on-metal reactions.

Example embodiments and methods thus being described, it will be appreciated by one skilled in the art that example embodiments may be varied and substituted through routine experimentation while still falling within the scope of the following claims. For example, a generally annular slip joint connection has been shown in connection with an example; however, other configurations and shapes of slip joints, and diffusers and inlet mixers therein, are compatible with example embodiments and methods simply through proper dimensioning and placement—and fall within the scope of the claims. Such variations are not to be regarded as departure from the scope of these claims.

What is claimed is:

1. A clamp for sealing a slip joint formed by a juncture of a diffuser and inlet mixer in a nuclear reactor, the clamp comprising:
   a plurality of moveable clamp arms shaped to seat on a top end of the diffuser and against an outer surface of the inlet mixer;
   a joint moveably connecting at least two of the clamp arms to permit movement of the two clamp arms around the inlet mixer; and
   a lateral drive in one of the clamp arms, wherein the lateral drive extends in a transverse direction against the inlet mixer to bias the inlet mixer against an opposite one of the clamp arms, and wherein the lateral drive is positioned in the clamp arm to directly contact and bias only the inlet mixer in the slip joint.

2. The clamp of claim 1, wherein the plurality of moveable clamp arms are two annular halves that join to form a continuous annulus around an entire upper and inner perimeter of the diffuser.

3. The clamp of claim 2, wherein the joint is a pin allowing rotation of the two annular halves with respect to each other about a single axis with no other relative movement.

4. The clamp of claim 1, further comprising:
   a bolt between the two clamp arms configured to prevent the movement of the two clamp arms around the inlet mixer.

5. The clamp of claim 1, further comprising:
   an axial mount on one of the clamp arms, wherein the axial mount is configured to secure to only an exterior of the diffuser so as to prevent relative movement between the one clamp arm and the diffuser.

6. The clamp of claim 5, wherein the axial mount is a guide ear clamp shaped to clamp against an axial bottom end of a guide ear of the diffuser.

7. The clamp of claim 6, further comprising:
   a plurality of the axial mounts sufficient to clamp to each guide ear of the diffuser.

8. The clamp of claim 1, wherein the lateral drive includes a leaf spring captured in the one clamp arm.

9. The clamp of claim 8, wherein the leaf spring has a length in the clamp arm so as to extend at least 12 percent of a perimeter of the inlet mixer, and wherein the leaf spring has a thickness and spring constant to provide 750 pounds-force when compressed by an inch in the transverse direction.

10. The clamp of claim 8, wherein the lateral drive further includes a bolt connected to a wedge seating against the leaf spring in the one clamp arm, and wherein axial movement of the bolt causes transverse compression of the leaf spring via the wedge.

11. A clamp for sealing a slip joint formed by a juncture of a diffuser and inlet mixer in a nuclear reactor, the clamp comprising:
    at least two opposite clamp arms shaped to fit inside of the diffuser and against the inlet mixer in the slip joint and fill the slip joint completely; and
    a spring in one of the clamp arms configured to bias the inlet mixer in a transverse direction against at least one of the clamp arms without transversely loading the diffuser, and wherein the clamp in its entirety seats around only a single slip joint.

12. The clamp of claim 11, wherein the two opposite clamp arms are semi-circular and join to create a continuous annulus that fills the slip joint, the clamp further comprising:
    a bolt rigidly connecting the two opposite clamp arms, wherein the bolt may be loosened to allow movement of the clamp arms relative to each other.

13. The clamp of claim 12, further comprising:
    a driving bolt on a top of the clamp, wherein the driving bolt biases the spring in the transverse direction when rotated.

14. The clamp of claim 11, wherein the leaf spring is positioned in the clamp arm to directly contact and bias only the inlet mixer in the slip joint.

15. A clamp for sealing a slip joint formed by a juncture of a diffuser and inlet mixer in a nuclear reactor, the clamp comprising:
    a plurality of moveable clamp arms shaped to seat on a top end of the diffuser and against an outer surface of the inlet mixer;
    a joint moveably connecting at least two of the clamp arms to permit movement of the two clamp arms around the inlet mixer; and
    a lateral drive in one of the clamp arms, wherein the lateral drive extends in a transverse direction against the inlet mixer to bias the inlet mixer against an opposite one of the clamp arms, and wherein the clamp in its entirety seats around only a single slip joint.

* * * * *